United States Patent
Rajpathak

(10) Patent No.: US 8,699,349 B2
(45) Date of Patent: Apr. 15, 2014

(54) MULTI-FACTOR OPTIMIZED ROUTING

(75) Inventor: Vidyanand Rajpathak, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 334 days.

(21) Appl. No.: 11/925,295

(22) Filed: Oct. 26, 2007

(65) Prior Publication Data

US 2009/0109854 A1    Apr. 30, 2009

(51) Int. Cl.
H04L 12/28    (2006.01)

(52) U.S. Cl.
USPC .................................... 370/238; 370/254

(58) Field of Classification Search
USPC .......... 709/223, 224, 226, 238, 241; 370/238, 370/252, 254, 230, 235
See application file for complete search history.

(56) References Cited

U.S. PATENT DOCUMENTS

| | | | | |
|---|---|---|---|---|
| 5,590,171 | A * | 12/1996 | Howe et al. | 379/33 |
| 6,078,652 | A * | 6/2000 | Barak | 379/114.02 |
| 6,598,077 | B2 * | 7/2003 | Primak et al. | 709/219 |
| 6,658,000 | B1 * | 12/2003 | Raciborski et al. | 370/386 |
| 6,865,594 | B1 * | 3/2005 | Belissent et al. | 709/206 |
| 7,050,555 | B2 * | 5/2006 | Zargham et al. | 379/115.01 |
| 2002/0163882 | A1 * | 11/2002 | Bornstein et al. | 370/227 |
| 2002/0169890 | A1 * | 11/2002 | Beaumont et al. | 709/245 |
| 2002/0194335 | A1 * | 12/2002 | Maynard | 709/225 |
| 2003/0099237 | A1 | 5/2003 | Mitra et al. | |
| 2003/0210694 | A1 | 11/2003 | Jayaraman et al. | |
| 2006/0013230 | A1 | 1/2006 | Bosloy et al. | |
| 2006/0140136 | A1 | 6/2006 | Filsfils et al. | |
| 2006/0167985 | A1 | 7/2006 | Albanese et al. | |
| 2007/0025327 | A1 | 2/2007 | Raciborski et al. | |

OTHER PUBLICATIONS

"Cisco Unified Intelligent Contact Management Enterprise 7.2", 1992-2007, Cisco Systems, Inc., pp. 5.
Pathan, et al., "A Taxonomy and Survey of Content Delivery Networks", Grid Computing and Distributed Systems (GRIDS), University of Melbourne, pp. 1-44.
Gritter, et al., "An Architecture for Content Routing Support in the Internet", Mar. 2001, Stanford University, pp. 12.

* cited by examiner

*Primary Examiner* — Yemane Mesfin
*Assistant Examiner* — Mon Cheri Davenport
(74) *Attorney, Agent, or Firm* — Ben Tabor; Kate Drakos; Micky Minhas

(57) ABSTRACT

A multi-factor optimized routing can select a computing device, from among multiple computing devices associated with a domain, to receive communications and thereby optimize one or more factors associated with such communications. Such multi-factor optimized routing can likewise specify a particular route, such as through the specification of one or more sub-networks. A performance monitoring system, comprising a performance monitoring framework that can support service-specific performance monitors can collect performance data to be used in the selection of a multi-factor optimized route. Additional data can be collected from other sources and the multi-factor optimized routing can be provided to a name resolution and routing system to ultimately route communications in an optimized manner.

20 Claims, 5 Drawing Sheets

MULTI-FACTOR OPTIMIZED ROUTING

BACKGROUND

To distinguish between multiple computing devices communicationally coupled to one another in a network arrangement, each computing device can be assigned a unique identifier. To provide for a sufficient quantity of unique identifiers, and to ensure uniqueness, multiple mechanisms were implemented, depending on the type of network and the quantity and type of computing devices. Traditionally, however, each of these mechanisms was based on numerical identifiers.

With the advent of world-wide networks of computing devices, such as the ubiquitous Internet, and, more recently, the now equally ubiquitous World Wide Web, the use of numerical identifiers was supplanted by linguistic identifiers that were more conducive to users. In particular, a computing device, while still identified by a numerical identifier, could likewise be identified by a linguistic identifier, such as a word or alpha-numeric combination. Tables correlating the numerical identifier to the linguistic identifier enabled users to take advantage of more meaningful identifiers, while retaining the benefits of numerical identification.

Within the context of the Internet, numerical identifiers, conforming to the Internet Protocol addressing system, and known as "Internet Protocol (IP) addresses", are associated with linguistic identifiers, traditionally domain names, though a Domain Name Service (DNS) that maintains routing tables comprising such correlations. To enable flexibility, the correlation between IP addresses and a domain name need not be one-to-one. Thus, multiple computing devices, each having a unique IP address, can each be correlated to a single domain name. In such a case, a computing device known as a "DNS server" will send successive communications specifying the domain name to the next IP address in a listing of IP addresses associated with the domain name and, thereby, distribute communications directed to the domain name equally among the computing devices whose IP addresses are associated with the domain name. If one such computing device were to be taken off of the network, another one of the computing devices could service further communications directed to the same domain name.

To provide efficient routing of communications between computing devices, "global load balancing" can be performed by computing devices that seek to identify the closest computing device correlated with a requested domain. Thus, for example, a request from a user in the United States for a web page hosted by a web site having a domain name of XYZcompany.com can be routed by DNS servers to a computing device whose IP address is associated with the XYZcompany.com domain name, and whose physical location is in North America if such DNS servers are provided, by a global load balancing device, a zone file listing IP addresses only for computing devices in North America. When performing global load balancing, an assumption is made that the shortest physical distance is the most optimal connection and, thus, global load balancing seeks to force DNS servers to direct users to computing devices, associated with the domain requested by the user, that are physically close to the user.

SUMMARY

In many situations involving network communications, the perceived responsiveness of communication can be approximately equivalent irrespective of which computing device, from among the computing devices associated with a particular domain name, is participating in the communications. Similarly, the perceived responsiveness of communication can be approximately equivalent irrespective of which route to a computing device the communications travel along. However, while the user may be indifferent as to which specific computing device and route is being used, the cost to the entity associated with the domain name can vary. For example, a user attempting to download a web page from a web domain associated with multiple computing devices scattered throughout the world may have a relatively similar experience irrespective of which of the computing devices scattered throughout the world actually provides the requested web page. Nevertheless, the network transmission costs may be significantly higher for a computing device, associated with that web domain, that is located in particular regions of the world, such as Asia or Latin America. Network transmission costs may also vary based on peak and off-peak times of network usage. In such a case, the entity associated with the web domain can reduce their network costs, while maintaining an equally responsive user experience, by serving web pages from those computing devices associated with lower costs at the time of the request.

In one embodiment, the routing of a request to one of the computing devices associated with the requested domain name, can be performed based on whichever route and whichever computing device provides for the lowest cost without an unacceptable reduction in user experience. The cost of network communication can be enumerated in a database that can be referenced to determine the cost of routing a request to any particular computing device from among the computing devices associated with the service level agreement for the requested domain name. Likewise, the performance of one or more network-enabled applications providing services on behalf of the domain name can be actively monitored and the results can be stored in a database. Performance data can further include network conditions within different geographic or political regions, thereby enabling the identification of various network carriers' network congestion and latency. A routing determination can, thus, be made based on the information obtained from the cost database and the information obtained from the performance database.

In another embodiment, a performance monitoring system can be used to provide information to a database regarding the performance of one or more network-enabled applications. The performance monitoring system can, in one embodiment, comprise plug-ins that can be configured in accordance with the performance monitoring system's guidelines and can, thereby, be executed by the performance monitoring system to provide application-specific, or service-specific, performance monitoring. In an alternative embodiment, the network-enabled applications providing services on behalf of the domain name can be configured to actively report predetermined performance data to the performance monitoring system.

In a further embodiment, one or more databases can record, not only communicational cost information and performance data, but also geographical location data correlating one or more network addresses to their physical locations and network carrier data identifying various network service providers, carriers and the like. Such data can, include geopolitical information, such as the blocking of content by various governments, in which case users could be directed to optimal "filtered" content, or network policy information, such as the refusal by one network carrier to service users of another network carrier, in which case alternative routings could be identified.

In a still further embodiment, a decision system can generate routing information, taking into account the cost of communication across a given network route, and the performance, both of the network route and of the computing device associated with the domain name. The routing information can be consumed by a network name resolution and routing system that can request updates from the decision system on a predefined basis. For example, the routing table can make use of timing metrics such as a "time to live" indicator, to provide dynamic control over the routing selected by the name resolution and routing system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

The following description relates to the determination and provision of multi-factor optimized routing that routes communications to a computing device, from among multiple computing devices each capable of providing the same service, such that the routing selected optimizes one or more factors while maintaining a threshold user experience. Optimized factors can include the cost of the routed communication data, the balancing of a communicational load across the multiple computing devices, the responsiveness of the network, the user experience, and other like factors. The optimized factors can be monitored by a performance monitoring system, or they can be accounted for by data received from external sources. The monitoring data and the received data can be utilized to develop routing tables that account for the multi-factor optimized routing, and the routing tables can be provided to name resolution and routing servers, which can, in turn, provide standard Domain Name System (DNS) services.

The techniques described herein focus on, but are not limited to, the provision of routing services within the context of the Internet. Indeed, the multi-factor optimizing routing can equally be used within any network arrangement and any network between multiple computing devices. For example, the mechanisms described below can be identically applied to corporate intranets, personal networks and any other network where various characteristics, such as cost, speed, capacity and availability of the routes between computing devices differ for different routes.

Figure 1:
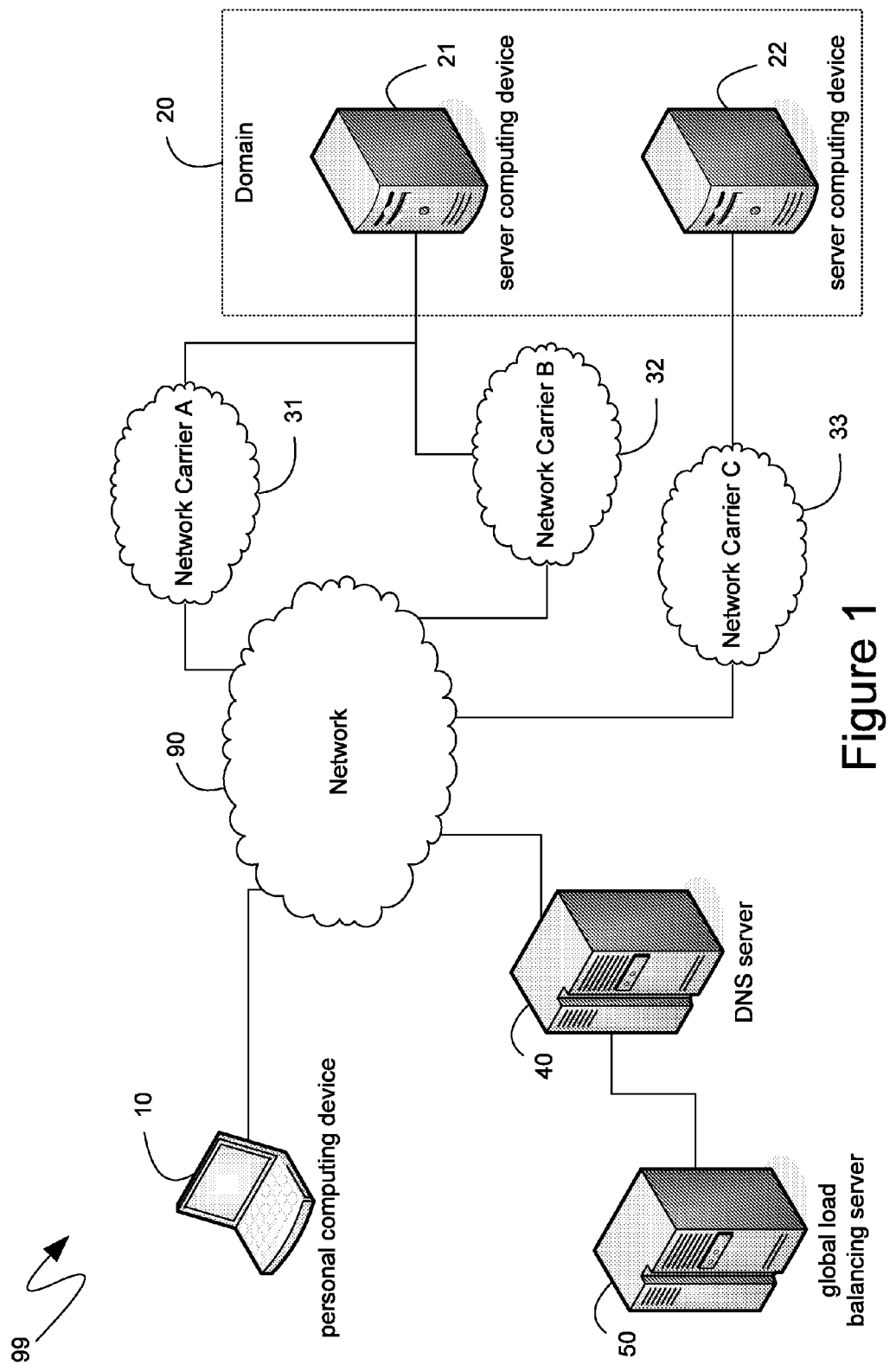
FIG. 1 is a block diagram of an exemplary system that provides context for the described functionality.

Turning to FIG. 1, an exemplary network system 99 is illustrated comprising a personal computing device 10, server computing devices 21 and 22, a DNS server 40, a global load balancing server 50 and a network 90 comprising various sub-networks 31, 32 and 33, provided by various network carriers nominated A, B and C, respectively in FIG. 1. Within the context of FIG. 1, the DNS server 40 can, in a traditional manner, provide routing services enabling the personal computing device 10 to establish contact with a requested domain 20. Specifically, the DNS server 40 can translate requests for a specified domain name into an identification of the unique address of one of the server computing devices associated with the specified domain in a round-robin manner. Thus, in the exemplary network of FIG. 1, one request from the personal computing device 10 for the domain 20 can cause the DNS server 40 to identify the server computing device 21, while a subsequent request can cause the DNS server to identify the server computing device 22.

Because, as may often be the case, the server computing devices 21 and 22 can be communicationally connected to the personal computing device 10 via differing network routes, the selection of one or more of the server computing devices 21 and 22 can result in the utilization of different networks or sub-networks. For example, communications between the personal computing device 10 and server computing device 21 can be routed via a sub-network 31 provided by network carrier A, while communications between the personal computing device 10 and server computing device 22 can be routed via a sub-network 33 provided by network carrier C. To provide the computing device 10 with more efficient communication, a global load balancing server 50 can instruct the DNS server 40 to, for example, provide only an identification of one of the server computing devices 21 and 22, whichever is physically closest to the personal computing device 10. Thus, if the personal computing device 10 and the server computing device 21 were located in North America, but the server computing device 22 was located in Europe, the global load balancing server 50 could provide a zone file to the DNS server 40 such that, for communications from the personal computing device, the domain 20 would be associated with only the server computing device 21 and the DNS server would, therefore, direct such communications to that server computing device.

As also shown in FIG. 1, a single computing device can be communicationally connected to multiple different sub-networks. Thus, for example, communications between the personal computing device 10 and the server computing device 21 could be equally routed via sub-network 31, provided by network carrier A, and sub-network 32, provided by network carrier B. In such a case, the mere specification, by DNS server 40, of a particular computing device associated with a specified domain may not be sufficient to limit the routing of communications to a particular sub-network. Instead, various routers that are part of the network 90 can select between routings using sub-network 31 or sub-network 32.

For various reasons, sub-networks 31, 32 and 33 may each have different factors associated with communications carried by them, including differing costs, speeds, bandwidths, tax savings, geo-political issues, and the like. For example, if sub-networks 31 and 32 are located within different time zones, communications via sub-network 31 may be cheaper during a particular time of day while communications via sub-network 32 may be cheaper during another time of day. Similarly, sub-network 31 may be more congested, and have less available bandwidth, during one time of day, while sub-network 32 may be more congested during a different time of day. As another example, sub-network 33 may be located within a geo-political boundary that may restrict specific forms of communications or, alternatively, may provide tax incentives for routing communications along sub-network 33. As will described in detail below, one or more factors differing between communications carried by various sub-networks can be taken into account by the routing provided, such as by the DNS server 40 or other routing computing devices.

Although not required, the descriptions below will be in the general context of computer-executable instructions, such as program modules, being executed by one or more computing devices. More specifically, the descriptions will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments where tasks are performed by remote processing devices that are linked through a communications network. In a distributed computing environment, program modules may be located in both local and remote memory storage devices.

Figure 2:
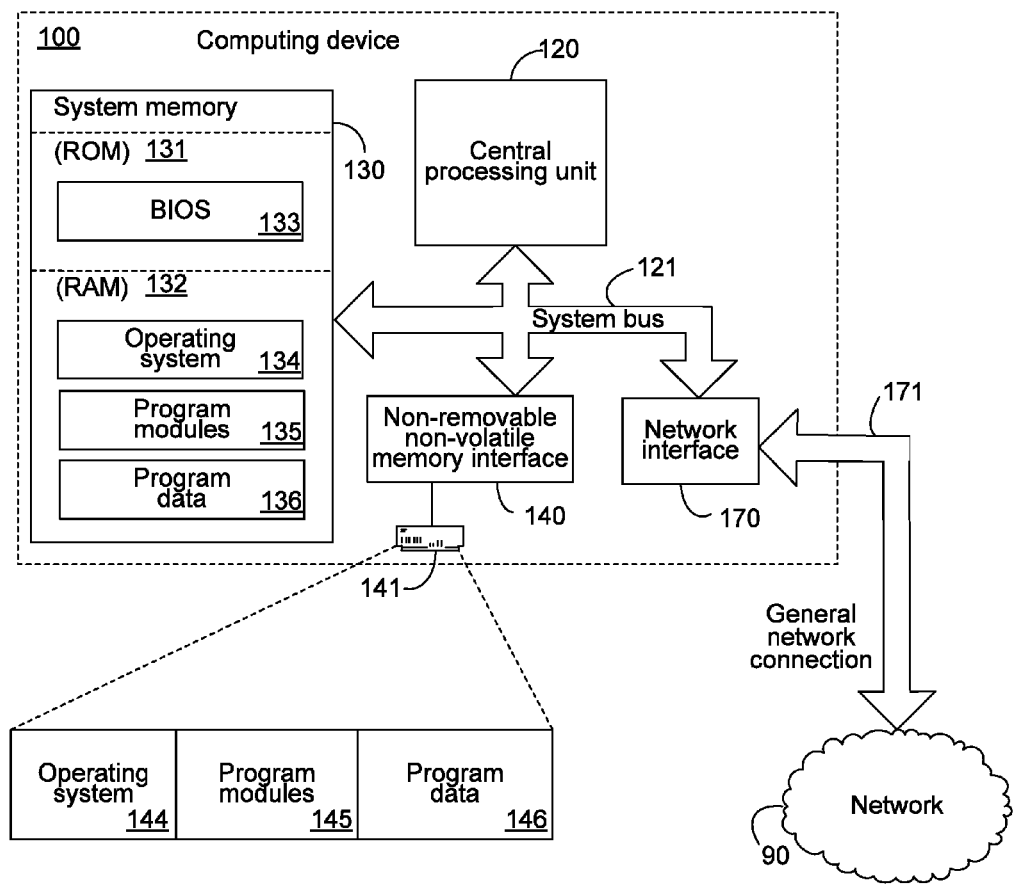
FIG. 2 is a block diagram of an exemplary computing device.

With reference to FIG. 2, an exemplary computing device 100 is illustrated. The computing device 100 can represent any of the computing devices 10, 21, 22 and 40 shown in FIG. 1, as well as any of the computing devices referenced below. The exemplary computing device 100 can include, but is not limited to, one or more central processing units (CPUs) 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures.

The computing device 100 also typically includes computer readable media, which can include any available media that can be accessed by computing device 100 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 2 illustrates an operating system 134, other program modules 135, and program data 136.

The computing device 100 may also include other removable/non-removable, volatile/nonvolatile computer storage media. By way of example only, FIG. 2 illustrates a hard disk drive 141 that reads from or writes to non-removable, non-volatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 2, provide storage of computer readable instructions, data structures, program modules and other data for the computing device 100. In FIG. 2, for example, hard disk drive 141 is illustrated as storing an operating system 144, other program modules 145, and program data 146. Note that these components can either be the same as or different from operating system 134, other program modules 135 and program data 136. Operating system 144, other program modules 145 and program data 146 are given different numbers here to illustrate that, at a minimum, they are different copies.

Of relevance to the descriptions below, the computing device 100 may operate in a networked environment using logical connections to one or more remote computers. For simplicity of illustration, the computing device 100 is shown in FIG. 2 to be connected to a network 90 that is not limited to any particular network or networking protocols. The logical connection depicted in FIG. 2 is a general network connection 171 that can be a local area network (LAN), a wide area network (WAN) or other network. The computing device 100 is connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

As indicated previously, in using the general network connection 171 to communicate with one or more computing devices also connected to the network 90, communications to and from the computing device 100 may be routed along one of multiple network routes encompassing different sub-networks or connections. Such different network routes can have differing characteristics and, even when the network communication is such that a user would not perceive a difference between any two or more routes, such routes can, nevertheless, differ in factors that may be significant to entities providing network-centric services, such as web page hosting, file transmission, and the like.

Figure 3:
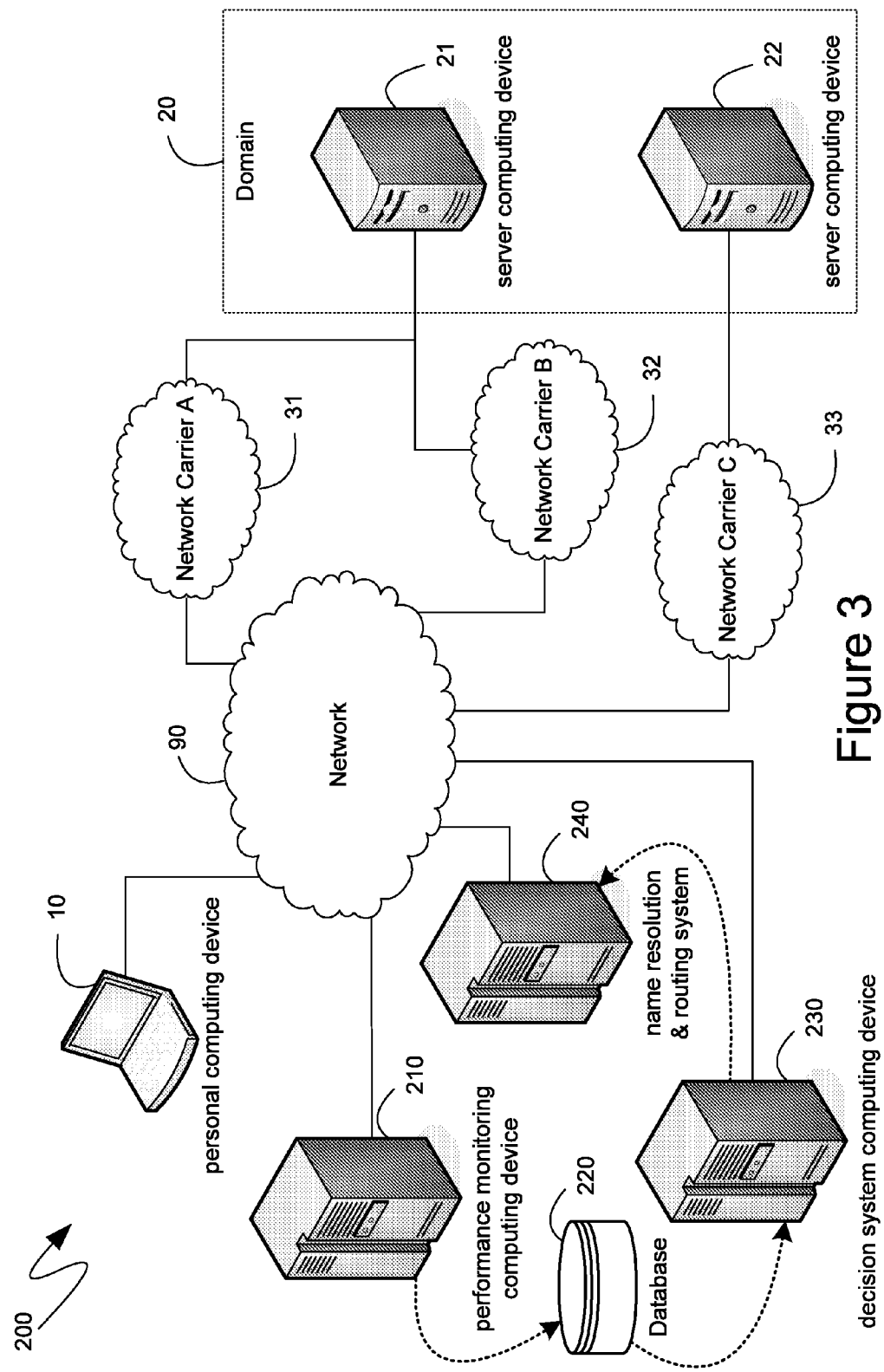
FIG. 3 is a block diagram of an exemplary system providing multi-factor optimized routing according to one embodiment.

Routing that takes into account the differing factors present in routes that, to a user, appear equivalent, can enable entities to optimize routing in view of one or more factors. Information concerning such factors can be stored in a database that can be accessed by a decision system that is designed to provide for routing that can optimize one or more of those factors in accordance with an entity's desires. Turning to FIG. 3, the DNS server 40 of FIG. 1, as well as other routing computing devices present as part of the network 90 or sub-networks 31, 32 and 33, can be supplemented by a more intelligent and more capable name resolution and routing system 240, in combination with a decision system computing device 230 that can obtain relevant information from a database 220. The database 220, in turn, can receive relevant information from multiple sources, including a performance monitoring computing device 210.

In one embodiment, the responsiveness of network communications from a user's computing device, such as the personal computing device 10 of FIG. 3, to a server computing device associated with a domain, such as domain 20, can be maintained while optimizing one or more other factors via the selection of a particular server computing device associated with the domain, or the selection of a particular routing to a server computing device associated with the domain. To monitor the responsiveness of network communications, as perceived by a user, a performance monitoring computing device 210 can implement a performance monitoring system that can provide a framework for the active monitoring of one or more applications or processes on a server computing device, such as server computing device 21 or 22, that provide network-centric services or otherwise engage in network communications. Because it is the user's perception of the responsiveness of the network communications that can be of primary concern to entities providing network-centric services, issues that are more accurately application issues and not network issues, such as crashes and the like, are included within the performance that is monitored by systems executing on the performance monitoring computing device 210.

The results of the monitored performance can be provided, by the performance monitoring computing device 210, to a database 220 that can comprise information relevant to the selection of multi-factor optimized routing. In addition to the performance data received from the performance monitoring computing device 210, the database can receive performance information from external sources, such as, for example, from the network carriers 31, 32 and 33, themselves. Such performance information could include network congestion and latency information, including, for example, a map-like presentation relating the network performance information with particular geographic regions, thereby enabling the decision system, which will be described in further detail below, to route data communications to avoid such network delays.

The database 220 can, in another embodiment, include data that is less variable and, consequently, need not be updated as frequently. For example, the costs of transmitting data across various sub-networks, such as sub-networks 31, 32 and 33 can be established via a contractual relationship between an entity, such as the entity providing the domain 20, and network carriers, such as network carriers A, B and C, respectively, as illustrated in FIG. 3. Consequently, such cost information, once established, can be entered into the database 220. Likewise, information regarding tax-credits, or other contractual or service-agreement-related information, can likewise be entered into the database 220.

In a further embodiment, the database 220 can comprise information regarding factors that vary in a predetermined manner. For example, the cost of transmitted data across a sub-network can vary depending on the time of day and the day of the week. In such a case, the database 220 can comprise information regarding the cost variation as a function of time, enabling the decision system, hosted by the decision system computing device 230, to select an appropriate routing depending on when the communication is occurring.

The database 220 can, in a still further embodiment, comprise fairly static information, such as geo-political information or network policy information. For example, the database 220 can comprise a listing of content that is blocked by various governments and, optionally, for such blocked content, the database can further comprise one or more alternative "filtered" content, thereby enabling the decision system, described in detail below, to select an optimal routing to such filtered content. As another example, the database 220 can comprise information regarding the refusal by one network carrier to service users of another network carrier. In such a case, the database 220 can further comprise information regarding one or more alternative routings which could then be selected by the decision system based on a multi-factor optimization.

The information in the database 220 can be used by a decision system hosted by the decision system computing device 230 to select network communication routes that optimize one or more factors. In one embodiment, the routing selected can optimize other factors while maintaining a user's perception of the responsiveness of the network communications. Thus, for example, the routing selected can minimize the cost to the entity providing a domain, such as domain 20, while maintaining the user's perception of the responsiveness of services hosted by the domain 20. The routing selected by the decision system hosted by the decision system computing device 230 can be provided to name resolution and routing system 240, or to other computing devices that can perform route determination, to enable multi-factor optimized routing.

For example, within the context of the exemplary network environment 200 of FIG. 3, the entity providing domain 20 can seek to minimize their network costs without degrading the performance of the network-centric services provided by that domain. A performance monitor hosted by the performance monitoring computing device 210 can monitor the performance of various network-centric services hosted by the computing devices associated with the domain 20, such as server computing devices 21 and 22, including the monitoring of the performance of such services as received via sub-networks 31, 32 and 33. The performance data can be provided to the database 220, along with other relevant data, such as the variance of the network transmission costs as a function of time for the various sub-networks 31, 32 and 33.

The decision system hosted by the decision system computing device 230 can, based on the information in the database 220, provide routing information to the name resolution and routing system 240, which can use such information to provide, in part, standardized routing services, such as would have been provided by the DNS server 40. For example, if the performance data indicated no difference in the user's perception of services provided by either the server computing device 21 or the server computing device 22, and if the cost data indicated that communications via sub-network 33 were less expensive than communications via sub-network 32 during the hours of noon until midnight, then the decision system hosted by the decision system computing device 230 could create a routing entry for use by the name resolution and routing system 240 which would be provided at noon, and which would indicate that requests, such as from the personal computing device 10, for the domain 20 are to be routed to the server computing device 22, thereby taking advantage of the lower cost of the communications via sub-network 33. The routing entry can further specify an expiration in 12 hours, thereby causing the name resolution and routing system 240 to look for an update at that time. The updated routing entry, which can be subsequently provided by the decision system computing device 230, can then specify that requests for the domain 20 are to be routed to the server computing device 21 via sub-network 32, thereby taking advantage of the lower cost of communications via sub-network 32 during the relevant time periods. Other factors, including bandwidth, load, geo-political concerns, and the like, can likewise be balanced by the decision system hosted by the decision system computing device 230.

Figure 4:
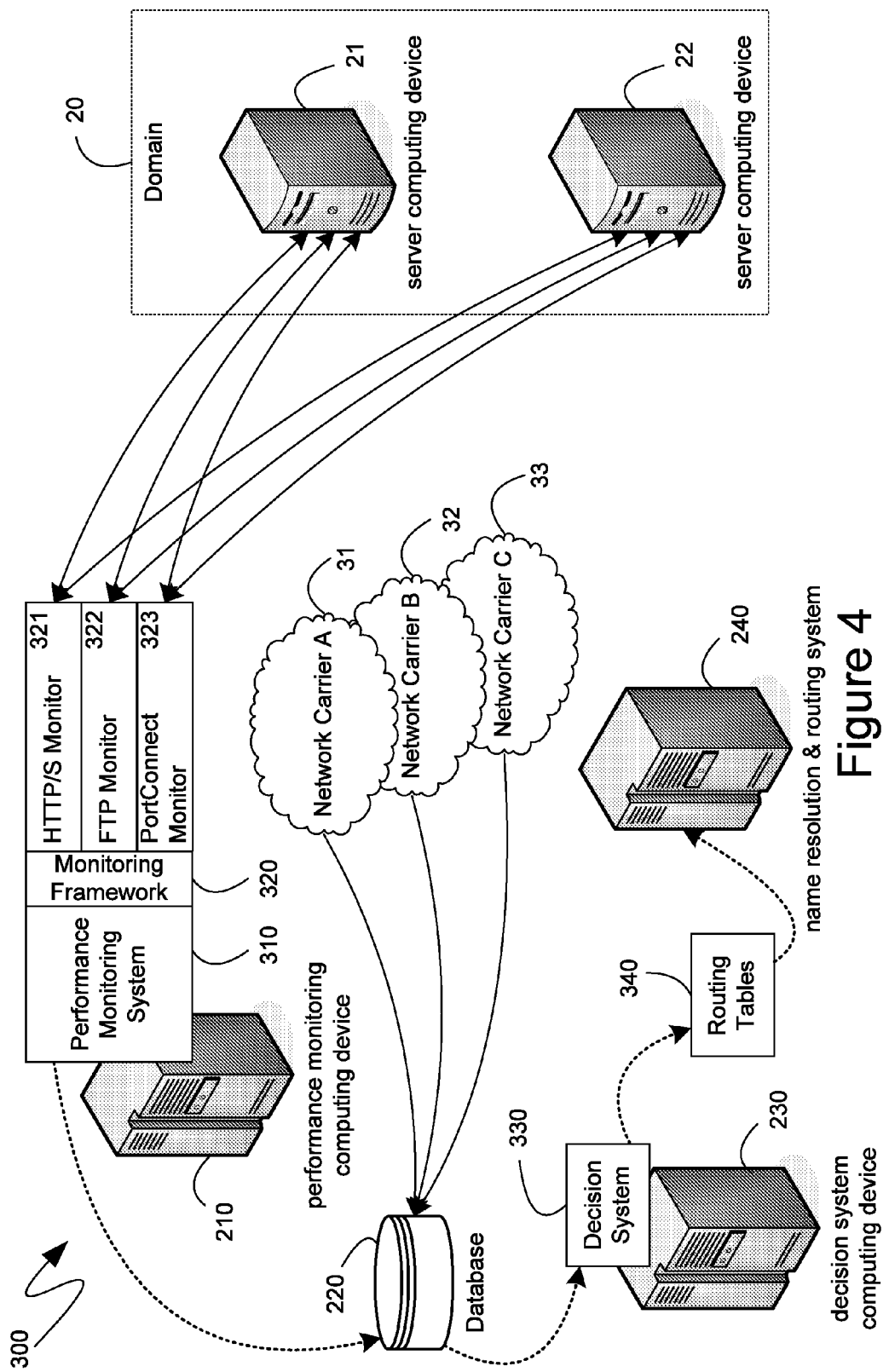
FIG. 4 is a block diagram of an exemplary system providing multi-factor optimized routing according to another embodiment.

Turning to FIG. 4, a system 300 for providing multi-factor optimizing routing is illustrated in greater detail. In one embodiment, the performance monitoring system 310, hosted by the performance monitoring computing device 210, can comprise a monitoring framework 320 that can provide for routine hosting of one or more performance monitors, such as the HTTP(S) Monitor 321, the FTP Monitor 322 and the PortConnect Monitor 323. The monitoring framework 320 can provide a structure by which various monitors specify elements associated with their operation, such as how often the monitor is to be executed, the manner in which the results collected by the monitor are to be interpreted, the actions that should occur if the monitor encounters an error, and other like settings. The monitoring framework 320 can then execute the monitors in accordance with the provided settings, and provide the data received from the monitors to the performance monitoring system 310.

Each monitor, such as the HTTP(S) Monitor 321, the FTP Monitor 322 and the PortConnect Monitor 323, can actively monitor a particular feature or service hosted by a target domain, such as the domain 20. For example, the HTTP(S) Monitor 321 can monitor communications conforming to the HyperText Transfer Protocol (and secure variants) by, for example, timing various HTTP requests and responses directed to the server computing devices 21 and 22. Similarly, the PortConnect Monitor 323 can monitor the availability and performance of various ports open on the server computing devices 21 and 22. Because HTTP communication performance can change quickly, such as during a denial of service attack, or simply at peak times, the HTTP(S) Monitor 321 can specify to the monitoring framework 320 that it is to be executed on a repeating cycle that repeats frequently. Similarly, because port monitoring can often experience time-out errors, the PortConnect Monitor 323 can specify to the monitoring framework 320 an appropriate course of action in the event of such time-out. The monitoring framework 320 can then execute each of the monitors in accordance with the indicated settings, and provide the data collected by the monitors to the performance monitoring system 310.

As indicated previously, the performance monitoring system 310 can provide performance data to the database 320. The database 320 can likewise receive relevant information from other sources. While the illustrative embodiment of FIG. 4 shows the receipt of, for example, cost data from the network carriers A, B and C providing the sub-networks 31, 32 and 33, respectively, the data received by the database 320 can originate with any source and can be received either through automated means, such as an automatic update providing data in a predetermined format, or through manual means, whereby the relevant data can be entered by a human user.

The decision system 330, hosted by the decision system computing device 230, can reference the database 220 when determining a routing of communications that optimizes the one or more factors specified. The resulting routings can be specified in the form of routing tables 340 that can be provided to the name resolution and routing system 240. In one embodiment, the name resolution and routing system 240 can provide routing services such as were provided the DNS server 40, but can have further intelligence and capabilities to, for example, seek new routing tables at predetermined times from the decision system 330. Thus, as described above, mechanisms such as "time to live" can be used to provide for a time-dimensional aspect to the routing tables 340, enabling the routing to change over time and, thereby, respond to known time-based variances among factors stored within the database 220.

Figure 5:
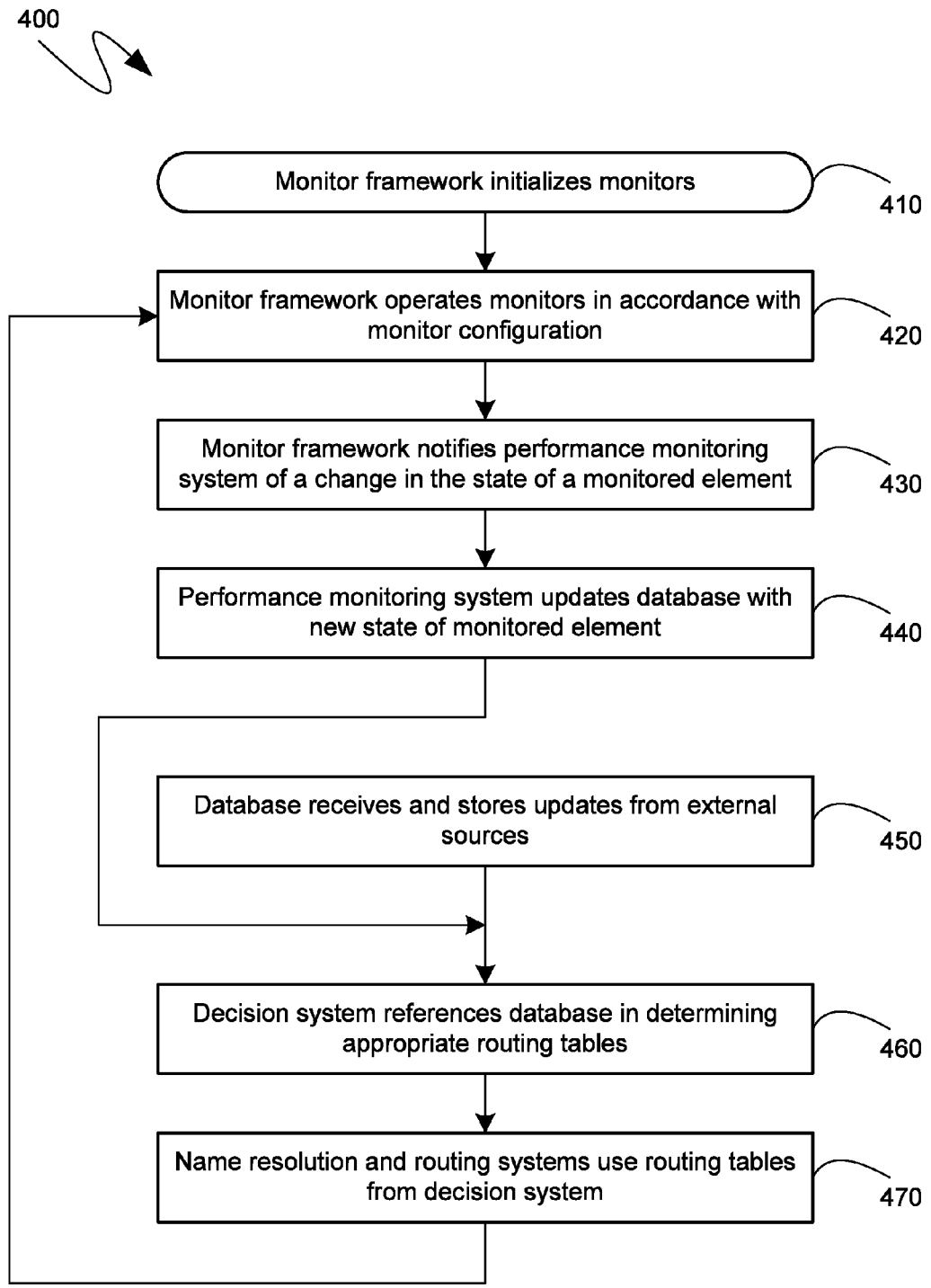
FIG. 5 is an exemplary multi-factor optimized routing flow diagram.

FIG. 5 illustrates a flow diagram 400 showing an exemplary series of steps that can be performed by the mechanisms illustrated in the system 300 to provide for multi-factor optimized routing. Initially, at step 410, the monitoring framework 320 can initialize the various monitors, such as the HTTP(S) Monitor 321, the FTP Monitor 322 and the PortConnect Monitor 323 of FIG. 4, that have registered themselves with the monitoring framework 320. Subsequently, at step 420, the monitoring framework 320 can execute the registered monitors in accordance with their configurations. Such execution, as indicated previously, can include the triggering of a monitor on a registered interval, the receipt of data in a registered form, and the handling of errors in a registered manner. In many cases, the monitored services or network capabilities may not often change in a material manner. In such cases, the monitoring framework 320 can notify the performance monitoring system 310 only when there is a change in the state or value of a monitored element. If such a change occurs, then, at step 430, the performance monitoring system 310 can receive an appropriate notification from the monitoring framework 320 and can, at step 440, update the database 220 with relevant performance information. In an alternative embodiment, the monitoring framework 320 can continually provide data to the performance monitoring system 310, and the performance monitoring system can determine when a change in the performance data received from the monitoring framework is sufficient to warrant a change to the database 220.

In parallel with the monitoring of the performance of one or more network services and communications provided by the performance monitoring system 310, and associated systems, the database 220 can receive information from external sources at step 450. As indicated previously, such external sources can be based on contracts, tax codes, geo-political issues and other sources. External sources can also include the server computing devices associated with the monitored domain, such as server computing devices 21 and 22. Thus, for example, if the entity providing the domain sought to balance the load among server computing devices 21 and 22, measurements from those servers regarding their load could be provided to the database 220 at step 450. External sources could further include external network and service monitoring and performance systems, network routing tables, service level agreements, data enabling identifications of geographical locations of computing devices based on their network addresses, and other like sources.

The decision system 330 can reference the database 220 at step 460 to determine routes that are optimal giving one or more factors specified by, for example, the entity associated with the monitored domain. The optimization can be performed using known mechanisms, such as mathematical analysis and determinations of local and absolute maximums and minimums given an appropriate weighting factor to values representing the specified factors. Once the one or more routes have been determined, including determinations of one or more server computing devices associated with the domain to which communications are to be routed, routing tables 340 can be provided at step 470 to the name resolution and routing system 240. Subsequently, steps 420 through 470 can be repeated to provide for continually updated multi-factor optimized routing.

As can be seen from the above descriptions, multi-factor optimized routing can determine network communicational routes, such as through the specification of one or more computing devices, associated with a domain, to which communications should be directed to optimize specified factors. In view of the many possible variations of the subject matter described herein, we claim as our invention all such embodiments as may come within the scope of the following claims and equivalents thereto.

I claim:

1. One or more computer-readable memory comprising computer-executable instructions for determining a multi-factor optimized network routing, the computer-executable instructions directed to steps comprising:
   obtaining performance data regarding network-centric services being provided by multiple computing devices associated with a domain;
   obtaining economic data associated with communications to the multiple computing devices associated with the domain;
   selecting one or more computing devices from among the multiple computing devices associated with the domain to receive communications directed to the domain, such that a route taken by the communications would simultaneously optimize both a performance of the network-centric services, as identified by the performance data, and a cost, as identified by the economic data; and
   providing routing information in the form of routing tables comprising temporal indicators specifying that the routing provided therein is to be utilized only during a defined time.

2. The computer-readable memory of claim 1, wherein the obtaining the performance data comprises: providing a performance monitoring framework through which one or more performance monitors can register; and executing the one or more registered performance monitors in accordance with registered options, wherein the one or more performance monitors each, individually monitor a defined aspect of the network-centric services.

3. The computer-readable memory of claim 2, wherein the executing the one or more registered performance monitors is performed in a periodic manner that is specified in the registered options associated with the one or more registered performance monitors.

4. The computer-readable memory of claim 1, wherein the economic data associated with communications to the multiple computing devices comprises geo-political-based costs.

5. The computer-readable memory of claim 1, wherein the economic data associated with communications to the multiple computing devices comprises load balancing.

6. A system for determining a multi-factor optimized network routing, the system comprising:
   one or more performance monitors that monitor network-centric services being provided by multiple computing devices associated with a domain;
   a performance monitoring framework that executes the performance monitors;
   a database comprising performance monitoring data regarding the network-centric services and economic data associated with communications to the multiple computing devices associated with the domain; and
   a decision system that references the database and selects one or more computing devices, among the multiple computing devices, to receive communications directed to the domain, such that a route taken by the communications would simultaneously optimize both a performance of the network-centric services, as identified by the performance monitoring data, and a cost, as identified by the economic data, and provides routing information in the form of routing tables comprising temporal indicators specifying that the routing provided therein is to be utilized only during a defined time.

7. The system of claim 6, wherein the performance monitoring framework comprises one or more registered options for each of the performance monitors specifying how the performance monitors are to be executed by the performance monitoring framework.

8. The system of claim 6 further comprising a performance monitoring system that receives performance information from the performance monitoring framework, determines if a state of the network-centric services has changed, and, if the state of the network-centric service has changed, updates the performance monitoring data in the database.

9. The system of claim 6, wherein the economic data associated with communications to the multiple computing devices comprises load balancing.

10. A method determining a multi-factor optimized network routing comprising the steps of:
   obtaining performance data regarding network-centric services being provided by multiple computing devices associated with a domain;
   obtaining economic data associated with communications to the multiple computing devices associated with the domain;
   selecting one or more computing devices from among the multiple computing devices associated with the domain to receive communications directed to the domain, such that a route taken by the communications would simultaneously optimize both a performance of the network-centric services, as identified by the performance data, and a cost, as identified by the economic data; and
   modifying a computer-readable storage medium of at least one name resolution and routing computing device, which provides Domain Name Service (DNS) functionality, to comprise routing information in the form of routing tables that comprise temporal indicators specifying that the routing provided therein is to be utilized only during a defined time.

11. The method of claim 10, wherein the obtaining the performance data comprises: providing a performance monitoring framework through which one or more performance monitors can register; and executing the one or more registered performance monitors in accordance with registered options, wherein the one or more performance monitors each, individually monitor a defined aspect of the network-centric services.

12. The method of claim 11, wherein the executing the one or more registered performance monitors is performed in a periodic manner that is specified in the registered options associated with the one or more registered performance monitors.

13. The method of claim 10, wherein the economic data associated with communications to the multiple computing devices comprises geo-political-based costs.

14. The method of claim 10, wherein the economic data associated with communications to the multiple computing devices comprises load balancing.

15. The computer-readable memory of claim 1, wherein the performance data comprises data quantifying performance of communications made using the HyperText Transfer Protocol (HTTP).

16. The computer-readable memory of claim 1, wherein the performance data is indicative of a responsiveness of a user experience in consuming the network-centric services.

17. The system of claim 6, wherein at least one of the one or more performance monitors is a HyperText Transfer Protocol (HTTP) performance monitor monitoring a performance of HTTP-based communications.

18. The system of claim 6, wherein the one or more performance monitors comprise at least two performance monitors that are independent of one another and are independently executed by the performance monitoring framework.

19. The method of claim 10, wherein the performance data comprises data quantifying performance of communications made using the HyperText Transfer Protocol (HTTP).

20. The method of claim 10, wherein the performance data is indicative of a responsiveness of a user experience in consuming the network-centric services.

\* \* \* \* \*